United States Patent
Nacman

(10) Patent No.: US 6,778,293 B1
(45) Date of Patent: Aug. 17, 2004

(54) FAST SCAN IMAGE REGISTRATION METHOD AND APPARATUS FOR HIGH ADDRESSABLE VIDEO SYSTEMS

(75) Inventor: Aron Nacman, Penfield, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/204,395

(22) Filed: Dec. 2, 1998

(51) Int. Cl.[7] .............................................. G01D 15/16
(52) U.S. Cl. ..................... 358/1.7; 358/1.18; 358/1.5; 358/1.12; 382/151
(58) Field of Search .................. 358/1.1–1.9, 1.11–1.18, 358/296, 300; 346/53–59, 79, 83; 347/116, 118, 224–237; 382/151, 208, 287, 291, 292; 700/56; 359/196, 197, 212

(56) References Cited

U.S. PATENT DOCUMENTS

| | | | | |
|---|---|---|---|---|
| 4,646,270 A | * | 2/1987 | Voss | 365/230 |
| 4,663,523 A | * | 5/1987 | Swanberg | 250/235 |
| 5,274,394 A | * | 12/1993 | Corona et al. | 346/1.1 |
| 5,278,587 A | | 1/1994 | Strauch et al. | 347/118 |
| 5,291,392 A | * | 3/1994 | Gerber et al. | 700/56 |
| 5,381,165 A | * | 1/1995 | Lofthus et al. | 346/108 |
| 5,412,409 A | | 5/1995 | Costanza | 347/118 |
| 5,729,663 A | * | 3/1998 | Lin et al. | 358/1.9 |
| 5,732,162 A | * | 3/1998 | Curry | 382/294 |
| 5,737,003 A | | 4/1998 | Moe et al. | 347/116 |
| 5,760,914 A | | 6/1998 | Gauthier et al. | 382/293 |
| 6,359,641 B1 | * | 3/2002 | Nacman et al. | 347/235 |

* cited by examiner

Primary Examiner—King Y. Poon
(74) Attorney, Agent, or Firm—Fay, Sharpe, Fagan, Minnich & McKee, LLP

(57) ABSTRACT

Multiple components of an image produced by an image output device including a raster output scanner are registered by delaying an output high addressable bit stream for a time following each raster start of scan. A multiplicity of error values are added resulting in a total error integer component and a fractional component. Following the start of scan, a line sync generator delays for a number of first clock signals proportional to the integer component. After the delay, the line sync generator signals a buffer to input a video input byte. A parallel to serial shift register converts the input video byte into a high addressable bit stream. A delay register further delays the bit stream by the fractional component, which further refines where, along the raster, the bit stream will commence. Suitably, the system corrects for the errors in run time as the fast scan line is scanned.

17 Claims, 2 Drawing Sheets

FAST SCAN IMAGE REGISTRATION METHOD AND APPARATUS FOR HIGH ADDRESSABLE VIDEO SYSTEMS

BACKGROUND OF THE INVENTION

The present invention relates to the art of digital image printing. It finds particular application in conjunction with registering or aligning picture elements precisely in a raster output scanner printers and will be described with reference thereto. It is to be appreciated, however, that the invention may find further application in any other raster output scanning device including, but not limited to copiers, facsimile machines and the like.

Printers are known in the art wherein a raster output scanner (ROS) is positioned in an optical scan system to write an image on the surface of a moving photoreceptor belt. A modulated laser beam is swept across the photoreceptor surface after being directed against the facets of a rotating polygon. Each sweep exposes a raster line to a linear segment of a video signal image.

In color xerographic ROS printers, a plurality of ROS units are positioned adjacent to a photoreceptor belt surface or the like and selectively energized to create successive image exposures. High addressable ROS printers output a series of closely spaced binary dots (i.e. either on or off) which the human eye integrates into shades of color. The printer creates a component image exposure for each color component of the desired output image. For full color, four imagers are used, one for each of the three basic colors and a fourth for black images. Each image is placed in overlying registration with the other images and a composite color image is transferred to an output sheet. In high addressable printers these overlapping images are composed of the spaced binary dots nominally spaced 5 microns apart. Thus, each image must be precisely registered in both the photoreceptor process direction (also referred to as the 'slow scan' direction) and in the direction perpendicular to the process direction (referred to as the 'fast scan' direction). Misalignment or improper registration causes improper color matching and other image degradations.

Unfortunately, mechanical components (e.g. multiple rotating polygons, and the moving receptor belt) of such systems often induce registration errors including:

Start of scan to video clock asynchronous jitter;

Polygon facet jitter;

Photoreceptor motion errors; and

Paper to photoreceptor registration errors.

Few techniques are known for improving image registration. Typically these techniques receive registration errors from other subsystems, and make a correction based on the errors provided. One method involves mechanically "steering" the photoreceptor belt. The registration system disclosed in U.S. Pat. No. 5,737,003 includes a belt steering control system that steers the photoconductor belt based on errors detected from an upstream position to reduce continued deviation of the belt. The registration system also may include a scan control system that, based on the detected position, controls the modulation of laser beams scanned to form latent images on the photoconductor belt. However, in addition to being mechanically complex, and such methods are unable to correct for upstream or previous registration errors.

Another method disclosed in U.S. Pat. No. 5,278,587 registers the image by controlling a video enable signal. The error signal in this system is an electrical current representative of the error. The electrical current is extrapolated to determine a midpoint for an illumination profile crossing the scan line and, from this, a reference time is calculated at which the midpoint of the beam illumination was reached. This reference time is then used to generate a timed line sync signal which registers the first scan line of each image sequence. However, this method only registers the first scan line and thus image quality may deteriorate as the image proceeds in the slow scan direction.

The present invention contemplates a new, efficient error correction apparatus and method of use which overcomes the above referenced problems and others.

BRIEF SUMMARY OF THE INVENTION

In accordance with the present invention, there is provided a method for correcting a fast scan registration error in a raster output scanner printing system receiving a video input byte and outputting a high addressable video bit stream. The method includes determining a delay factor corresponding to the fast scan registration error and then, delaying receipt of the video input byte for a delay factor. After the delaying, the video input is received and converted into the high addressable video bit stream. Effectively the bit stream is delayed by the first portion of the delay factor, thus correcting the registration error.

In accordance with another aspect of the present invention, the method further includes separating an integer component from the delay factor and delaying requesting the video input byte from a buffer for the integer component of the delay factor.

In accordance with another aspect of the present invention, the determining a delay factor includes summing errors including a predefined system error and a dynamically calculated run-time error.

In accordance with another aspect of the present invention, the determining a delay factor further includes adding a desired delay for a fast scan image shift to the delay factor.

In accordance with another aspect of the present invention, the method further includes synchronizing the video input byte with a first clock cycle, and synchronizing the high addressable video bit stream with a second clock cycle.

In accordance with another aspect of the present invention, the delaying output of the video bit stream step includes sequentially delaying each output bit for a number of second clock cycles proportional to the fractional portion of the delay factor.

In accordance with another aspect of the present invention, the delay factor is applied in run time as the raster output scanner scans successive rasters.

In another aspect of the present invention, a method is provided for registering a plurality of component images in a raster output scanner device by delaying output of a high addressable bit stream in a fast scan direction. At a scan line start, the method includes, determining a delay factor comprising an integer delay component corresponding to a number of whole pixels, and a fractional delay component corresponding to a number of partial pixels. A video input byte, delayed from the scan line start by the integer delay component, is received, thereby registering the high addressable bit stream after the scan line start to within a whole pixel. The video input byte is converted into the high addressable bit stream, and output further delayed from the scan line start by the fractional delay component.

In accordance with another aspect of the present invention, the determining the delay factor step includes summing: (1) a predefined device error value, (2) a dynamically calculated error value; and (3) an operator provided shift value.

In another aspect of the present invention, a video output system receives a video input byte, corrects at least one fast scan registration error and outputs a high addressable bit stream. The system includes a raster output scanner providing a start of scan signal indicative of starting a fast scan line. An adder is provided to calculate a sum of a set of fast scan registration errors upon receipt of the start of scan signal. A line sync generator signals a buffer to input the video input byte into the system, after delaying for a number of first clock cycles from the start of scan signal. The high addressable bit stream output is thus moved along the fast scan line, correcting the set of fast scan registration errors.

In accordance with another aspect of the present invention, the system also includes a parallel to serial shift register for converting the video input byte to the high addressable output bit stream. A delay register receives the bit stream from the shift register and delays outputting the high addressable bit stream by a fractional portion of the sum from the adder by at least a portion of a pixel corresponding to the fractional portion of the sum.

In accordance with another aspect of the present invention, the fast scan registration errors are corrected in run time as the fast scan line is scanned.

In accordance with another aspect of the present invention, the system further includes a device selected from the group of a laser printer, a facsimile machine or a copier for outputting the high addressable bit stream.

In accordance with another aspect of the present invention, the fast scan registration errors include: (1) a memory element containing a predefined error, (2) an error sensor dynamically calculating error, and (3) an operator interface for entering a desired image shift.

In accordance with another aspect of the present invention, the video output system further includes an application specific integrated circuit.

One benefit obtained by use of the present invention is correction of image registration errors in a high addressable video system at a sub-pixel level, resulting in more precise alignment of multiple component images.

Another benefit obtained by use of the present invention is mechanical simplicity over systems which steer the photoreceptor belt to correct for detected registration errors.

Other benefits and advantages of the subject new method will become apparent to those skilled in the art upon a reading and understanding of this specification.

BRIEF DESCRIPTION OF THE DRAWINGS

The invention may take physical form in certain parts and steps and arrangements of parts and steps, the preferred embodiments of which will be described in detail in the specification and illustrated in the accompanying drawings which form a part hereof and wherein.

DETAILED DESCRIPTION OF THE PREFERRED EMBODIMENT

Figure 1:
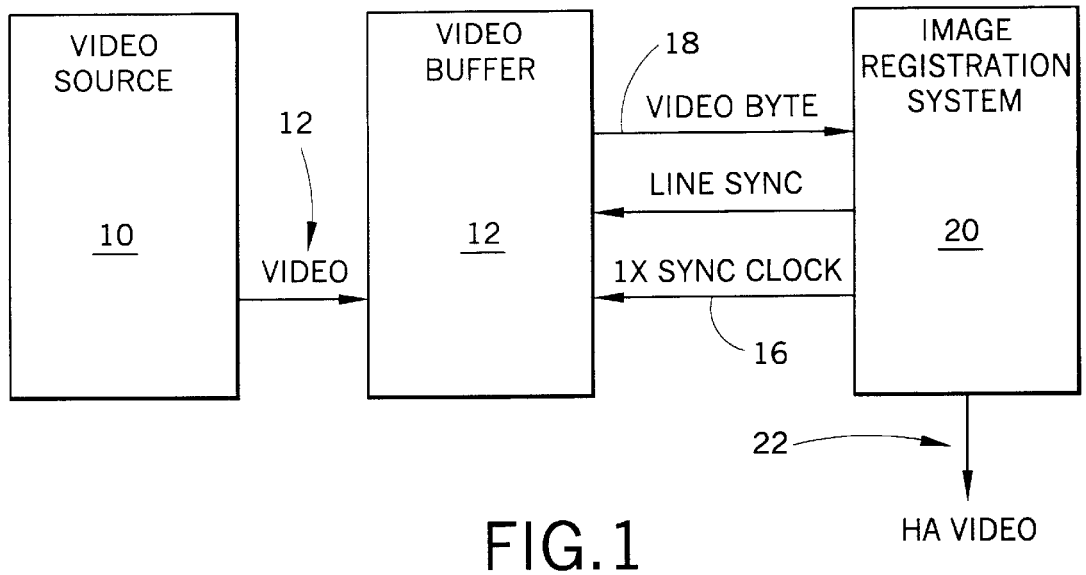
FIG. 1 is an overview diagram of a video system receiving a parallel byte of video, buffering it, and converting it to a series of video bits.

The present invention recognizes that registration errors degrade output image quality, especially in color imagers where multiple component images must be precisely aligned to form a composite, color image. The present invention also recognizes that many fast scan image registration errors can be corrected by moving or delaying the start of the image in the fast scan direction. Some errors, like facet jitter, require an update every scan line, and need sub pixel resolution. Another error, like paper to photoreceptor registration, is a one-time setup needing 1 pixel resolution and a 300 pixel range (in a 600 spi system). Table 1 lists other errors that may benefit from delaying the image in the fast scan direction.

TABLE 1

| Error type | Frequency of correction | Required resolution | Range |
| --- | --- | --- | --- |
| SOS to video clock asynchronous jitter | once per scan | 1/n pixel period resolution | 1 pixel period range |
| Facet jitter | once per scan | 1/n pixel period resolution | 1 pixel period range |
| Photoreceptor motion errors | once per 10–100 scans | 1/n pixel period resolution | 10–100 pixel range (600 spi system) |
| Paper to photoreceptor registration | one static value for each paper tray | 1 pixel resolution | 300 pixel range (600 spi system) |
| Image shifting | once per image | 1 pixel resolution | 1 scan line range (7200 pixels for 12 inch process in 600 spi system) |

Where n is the period of the HA clock.

Turning now to the drawings, wherein the showings are for purposes of illustrating the preferred embodiments of the invention, and not for purposes of limiting same, a video source 10 provides video 12 to a video buffer 14. The video buffer 14 stores successive 'bytes' of video information, and provides these bytes 18 one at a time to the image registration system 20 in response to a line sync signal 16 and a 1×sync clock. The line sync signal 16 is only active during each fast scan image line while the 1× clock sync is continuous. The video buffer 14 only outputs video when both the line sync and the clock are active. The image registration system 20 converts the successive parallel bytes into serial high addressable (HA) video format and further registers the video in response to input errors, the start of scan signal from the ROS and a 1×reference clock.

Figure 2:
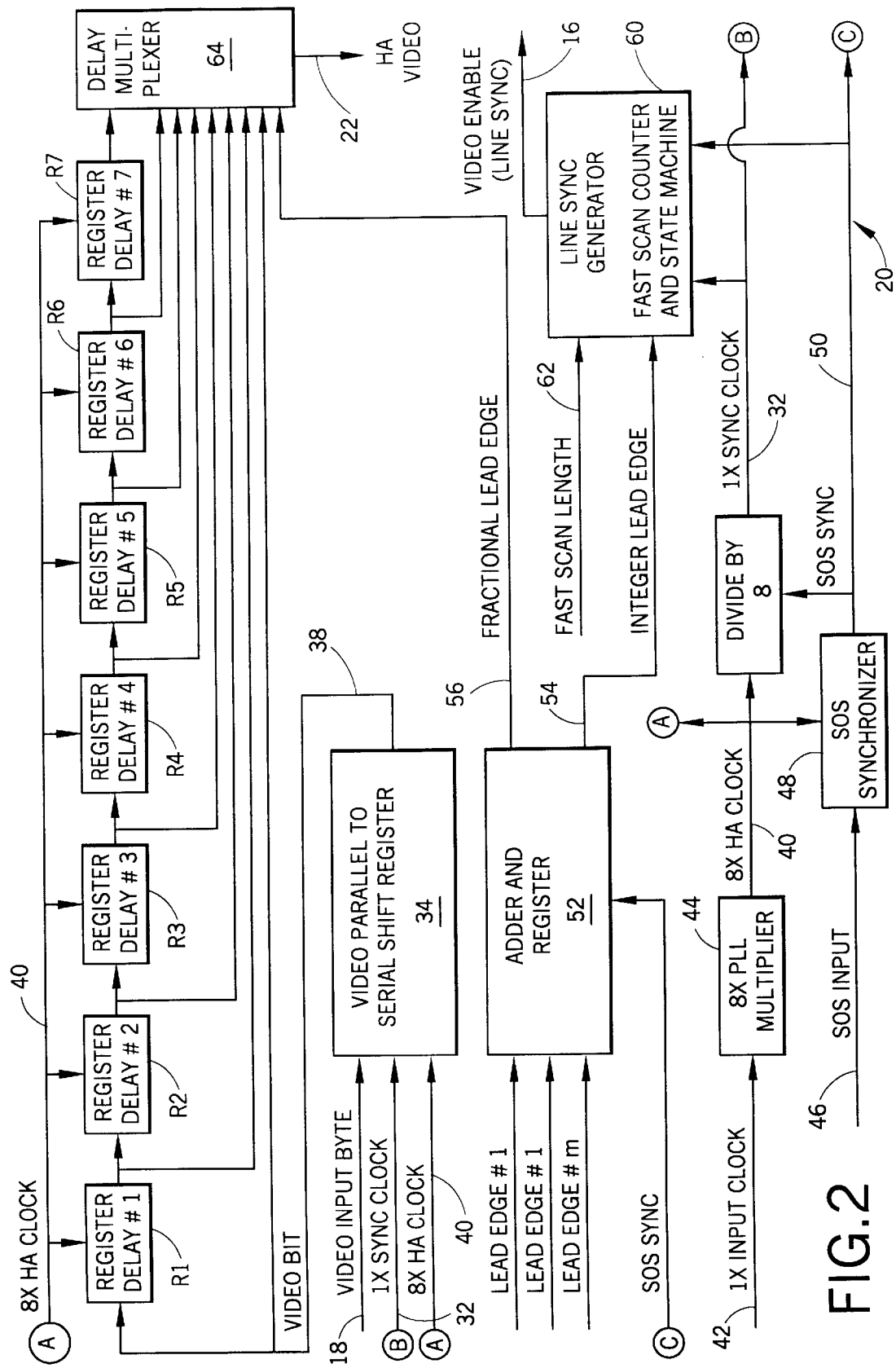
FIG. 2 is a detailed diagram of an image registration system suitable to practice present invention.

Now referring to FIG. 2, a suitable image registration system 20 is shown configured as an electrical circuit for 8-bit video input bytes and corresponding high addressable (HA) multipliers. However, the present invention is equally applicable to any size input byte in any high addressable system. The exemplary system 20, as illustrated, will have a pixel resolution of 600 spi in the fast scan direction and an 8×HA video output so that the final HA resolution is 4800 spi. The resolution for sub-pixel corrections is determined by the period of the HA clock, here 8×, so that sub-pixel resolution is ⅛ pixel. The video input byte 18 arrives in the circuit 20 one byte at a time at a 1×sync clock rate 32. The video input byte 18 is converted by shift register 34 from parallel format into HA video 38, and is sent to a high addressable bit stream delay circuit, more fully discussed below.

In order to create an 8×HA clock 40 to control the timing of the HA video 38, a 1×input reference clock 42 is synthesized up to the 8×clock rate using a PLL circuit 44. Unfortunately, the raster's start of scan (SOS) 46 is not synchronized to the 1×input clock 42. In order to synchronize these signals, SOS 46 is sampled (registered) with the 8×HA clock 40 in the SOS synchronizer 48. This ensures that SOS sync 50 is within ⅛ pixel of the input SOS 46 so that SOS sync 50 can be used for all SOS functions in the circuit 20. The 8×HA clock 40 is then divided by 8 and reset with SOS sync 50 producing the synchronized 1×clock 32 in phase relative to the SOS sync 50.

This timing and synchronizing provides the benefit of also yielding a registration correction. The first 1×sync clock 32 edge is always within ⅛ pixel (in this example) of input SOS 46. Because the 1×sync clock 32 controls the byte wide video input 18, the SOS to video clock asynchronous jitter (from Table 1, row 1) is synchronized to ⅛ pixel. All other fast scan errors, labeled lead edge #1—lead edge #m, are summed in the adder 52 and synchronized with SOS sync 50 to produce a total correction value at the highest needed update frequency. The number of bits for each correction is determined by the needed resolution and range of the correction.

For example, a correction needing ⅛ pixel resolution and a 32 pixel range requires 8 bits. The 5 most significant bits (MSB's) would define integer values from 0 to 31 pixels while the 3 least significant bits (LSB's) would define fractional values from 0 to ⅞ of a pixel at ⅛ pixel increments. The output of the adder 52 is separated into integer values 54 and fractional values 56. The integer values 54 are used as an input to a line sync generator 60. The line sync generator 60 synchronizes the integer values 54 to the SOS sync 50 and 1×sync clock 32 to delay the video enable 16 signal (cross-referencing FIG. 1) by the integer value 54 (1×clock sync period). Said another way, the line sync generator 60 holds or delays the line sync signal 16 by the whole integer value comprising a portion of the total delay. This delay has the effect of moving the video byte 18 in the fast scan direction by calculated integer multiples of the pixel. Thus, the line sync generator 60 defines the starting position and the length of the fast scan video line 62 at a whole pixel resolution.

On the other hand, the fractional delay values 56 are used to refine the delay in the fast scan direction by the fractional value comprising the remaining portion of the delay. Recalling from above, the HA video 38 proceeds from the shift register 34 to a series of register delays R1–R7. The HA video bits 38 cascade through the delay registers R1–R7 at the 8×HA clock rate 40. The output of each register delay is also provided as a data input to a delay multiplexer (MUX) 64. Controlling the output of the delay MUX is the fractional delay 56. An example is illustrative. When the MUX 64 address is "000" binary (i.e. no fractional delay component for the combined error from adder 52) the direct output from the shift register 34 is selected representing a delay of 0 fractions of pixels. When the MUX 64 address is "001" binary the output from register R1 which represents a ⅛ pixel delay is selected. When the MUX 64 address is "111" binary the output from register R7 which represents a ⅞ pixel delay is selected. In this way the system 20 can move the video in sub and super pixel increments while delivering HA video.

To reiterate, precise pixel placement on the page is required for high quality color images. Various factors induce errors in a video system, many of which can be corrected by delaying the initiation of pixel output for a time corresponding to the sum of the errors. Preferably, a system delays for both an integer multiple (or whole pixel delay) and a fractional multiple (or partial pixel delay). Following the delay, the output pixels will be precisely registered to within one bit, or 1/(the HA factor).

Figure 3:
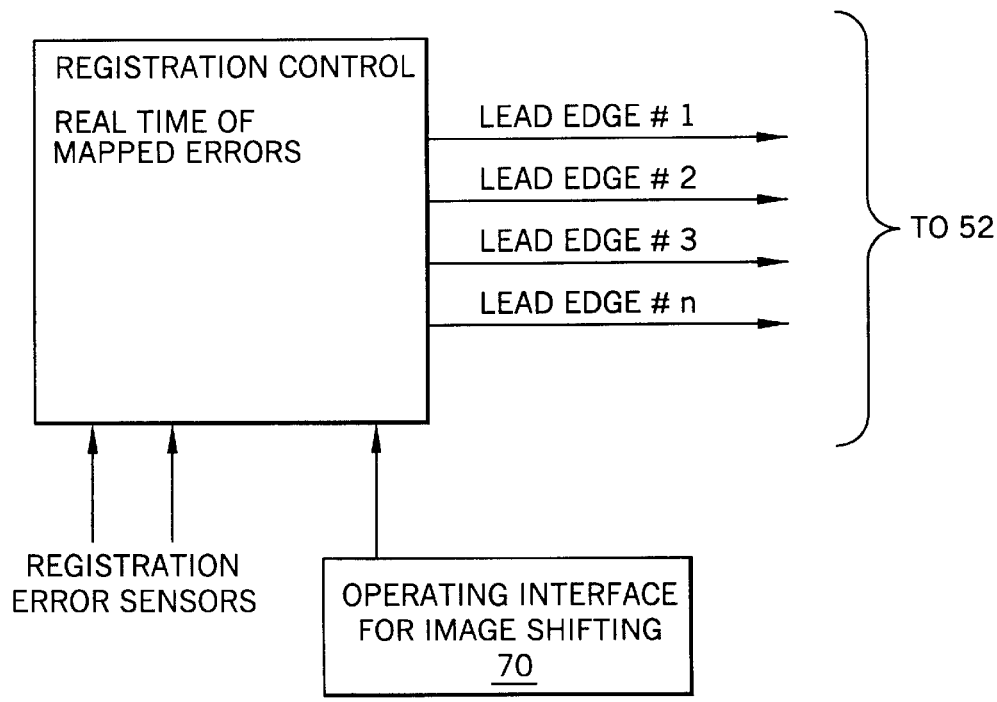
FIG. 3 is a diagram of error sources which illustrates another object of the invention.

In a related embodiment, the system 20 can also provide operator initiated image shifting in the fast scan direction. Referring to FIGS. 2 and 3, assume an operator wishes to shift an input image in the fast scan direction 4 inches, perhaps to reposition a graphic. An operator interface 70 will translate the correction into an error figure and the processing described above will delay the start of HA video output, resulting in the output image being moved the proper distance. In other words, the operator desired delay is converted into the corresponding number of whole and partial delay pixels, and the system performs as described above. Of course, if the image is moved beyond the borders of the output media, the image will be cropped.

The invention has been described with reference to the preferred embodiments. Potential modifications and alterations will occur to others upon a reading and understanding of the specification. It is our intention to include all such modifications and alterations insofar as they come within the scope of the appended claims, or the equivalents thereof.

Having thus described the preferred embodiment, the invention is now claimed to be:

1. A method for correcting a fast scan registration error in a raster output scanner printing system receiving a video input byte and outputting a high addressable video bit stream, the method comprising:

(a) determining a delay factor corresponding to the fast scan registration error;

(b) delaying receipt of the video input byte by the delay factor;

(c) after the delaying, receiving the video input byte; and (d) converting the received video input byte into the high addressable video bit stream, the bit stream being output delayed by the delay factor thereby correcting the determined fast scan registration error.

2. The method as set forth in claim 1 where said delaying receipt comprises:

separating an integer component from the delay factor; and delaying requesting the video input byte from a buffer for the integer component of the delay factor.

3. The method as set forth in claim 2 further comprising:

(e) delaying output of the high addressable video bit stream for a fractional component of the delay factor; and (f) after said delaying output, outputting the high addressable video bit stream, thereby correcting the determined fast scan registration error by the fractional component.

4. The method as set forth in claim 3 where said determining a delay factor comprises:

calculating the delay factor by summing errors including:
    a predefined system error from a memory, and
    a dynamically calculated run-time error, and separating the delay factor into the integer component and the fractional component.

5. The method as set forth in claim 4 where said determining a delay factor further comprises:

adding a desired delay for a fast scan image shift to the delay factor calculated.

6. The method as set forth in claim 1 further comprising:

synchronizing the video input byte with a first clock cycle; and synchronizing the high addressable video bit stream with a second clock cycle having a greater frequency than the first clock cycle.

7. The method as set forth in claim 6 where said delaying receipt further comprises:
   separating an integer component from the delay factor; and
   delaying requesting the video input byte from a buffer for a number of first clock cycles proportional to the integer component of the delay factor after receiving a start of scan signal.

8. The method as set forth in claim 7 further comprising:
   sequentially delaying each bit in the high addressable video bit stream for a number of second clock cycles proportional to a fractional portion of the delay factor.

9. The method as set forth in claim 8 further comprising:
   applying the delay factor in run time as the raster output scanner scans successive rasters.

10. A method for registering a plurality of component images in a raster output scanner device by delaying output of a high addressable bit stream in a fast scan direction, the method comprises:
    at a scan line start, determining a delay factor comprising an integer delay component corresponding to a number of whole pixels, and a fractional delay component corresponding to a number of partial pixels;
    receiving a video input byte delayed from the scan line start by the integer delay component, thereby registering the high addressable bit stream after the scan line start to within a whole pixel;
    converting the received video Input byte into the high addressable bit stream; and
    outputting the high addressable bit stream further delayed from the scan line start by the fractional delay component, thereby registering the high addressable bit stream after the scan line start to within a partial pixel.

11. The method for registering a plurality of component images as set forth in claim 10 where said determining the delay factor comprises:
    summing:
      a predefined device error value;
      a dynamically calculated error value; and
      a provided shift value.

12. A video output system for receiving a video input byte, correcting at least one fast scan registration error and outputting a high addressable bit stream, the system comprising:
    a raster output scanner providing a start of scan signal indicative of starting a fast scan line;
    an adder calculating a sum of the fast scan registration errors upon receipt of the start of scan signal; and,
    a line sync generator signaling a buffer to input the video input byte into the system, the line sync generator delaying signaling after receipt of the start of scan signal for a number of first clock cycles proportional to an integer portion of the sum calculated, such that the high addressable bit stream output converted from the input video input byte is delayed in accordance with the sum calculated, thereby moving the high addressable bit stream output along the fast scan line so as to correct the fast scan registration errors.

13. The video output system as set forth in claim 12 further comprising:
    a parallel to serial shift register converting the video input byte to the high addressable bit stream; and
    a delay register receiving the high addressable bit stream from the shift register and delaying output of the high addressable bit stream by a fractional portion of the sum from the adder, thereby registering the high addressable bit stream along the fast scan line by at least a portion of a pixel corresponding to the fractional portion of the sum.

14. The video output system as set forth in claim 13 where the fast scan registration errors are corrected in run time as the fast scan line is scanned.

15. The video output system as set forth in claim 14 further comprising:
    a device selected from the group of a laser printer, a facsimile machine or a copier for outputting the high addressable bit stream.

16. The video output system as set forth in claim 14 where the fast scan registration errors comprise:
    a memory element containing a predefined error;
    an error sensor dynamically calculating error; and
    an operator interface for entering a desired image shift.

17. The video output system as set forth in claim 14 further comprising an application specific integrated circuit.

* * * * *